UNITED STATES PATENT OFFICE.

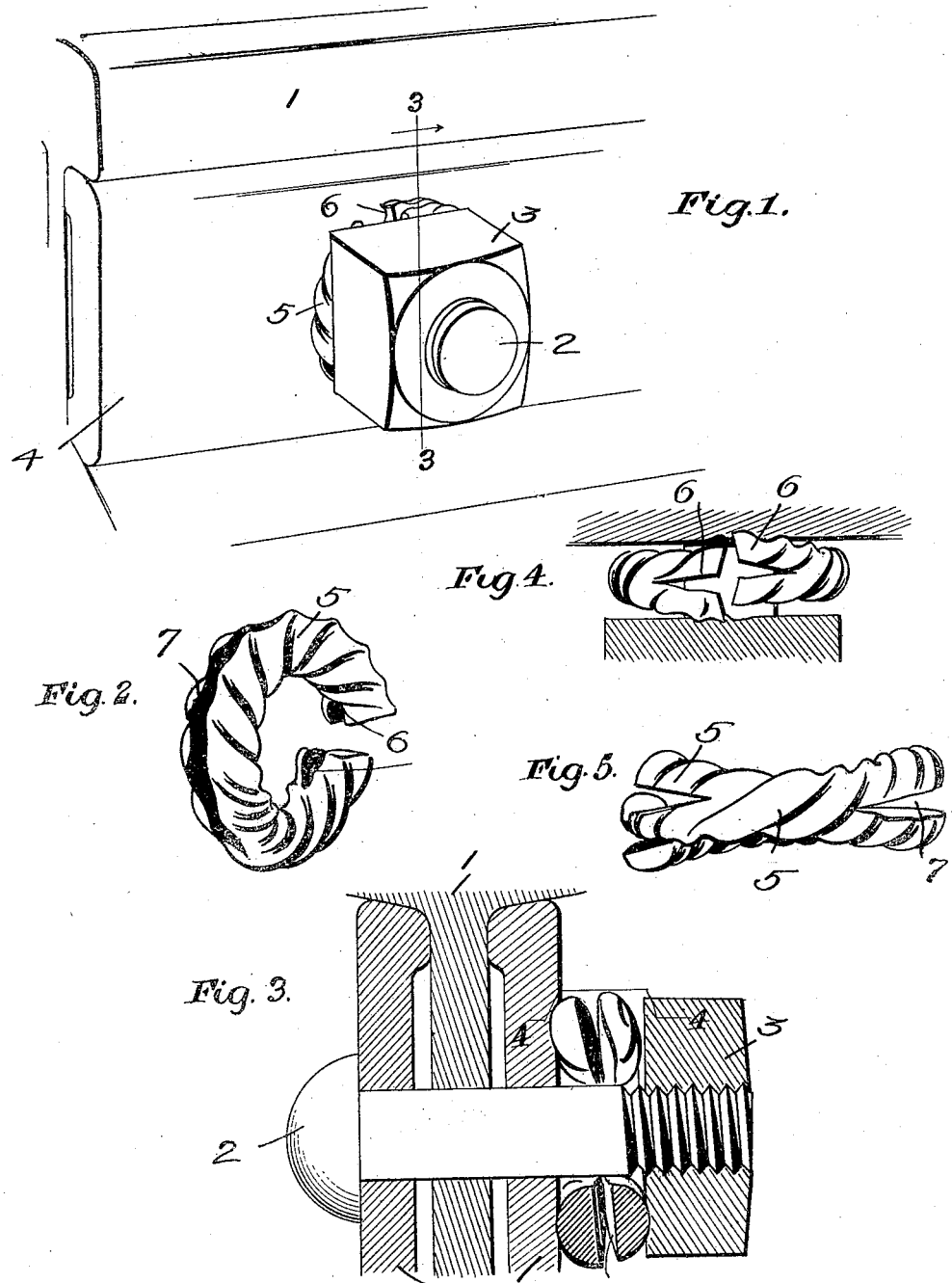

TOWNSON HAND, OF NEW HAVEN, CONNECTICUT.

NUT-LOCK.

1,245,907.   Specification of Letters Patent.   Patented Nov. 6, 1917.

Application filed November 18, 1916. Serial No. 132,103.

*To all whom it may concern:*

Be it known that I, TOWNSON HAND, a citizen of the United States, and a resident of New Haven, in the county of New Haven and State of Connecticut, have invented an Improvement in Nut-Locks, of which the following is a specification.

My invention is an improvement in nut locks, and has for its object to provide a lock of the character specified, wherein a split washer is provided having left hand spiral ribs or threads and having its ends offset with respect to each other laterally and being split at its ends and intermediate its ends in the plane of the washer, the sides of the split being separated for the purpose specified.

In the drawings:

Figure 1 is a perspective view of the improved lock in place.

Fig. 2 is a perspective view of the lock removed.

Fig. 3 is a section on the line 3—3 of Fig. 2 looking in the direction of the arrow adjacent to the line.

Fig. 4 is a section on the line 4—4 of Fig. 3.

Fig. 5 is a side view of the nut taken at right angles to Fig. 4.

The present embodiment of the invention is shown in connection with a rail joint indicated at 1, the lock being used in connection with the bolt 2 and the nut 3, and being arranged between the nut and the fish plate 4.

The improved lock is a split washer formed from a rod having spiral threads or grooves, the said threads being very coarse, as shown. The washer 5 is formed from stock having the spiral grooves, being bent into shape as shown, after certain cuts are made in the stock, as will be later described.

Each end of the stock is split, as indicated at 6, and the opposite sides of the split are separated slightly, as shown. The stock is again split midway between the ends, as indicated at 7, and the opposite sides of the split are separated to about the same extent as at the splits 6. The splits 6 and 7 are in the same plane, and in the plane of the washer.

The ends of the stock from which the washer is formed are pointed, as shown, and the side walls of the spiral groove or grooves in the stock have their side walls meeting at an angle, and the said threads or grooves are left hand threads. Thus when the washer is in place and the nut is screwed down the washer tends to embrace and cling to the bolt instead of turning with the nut. When the washer is formed, one of the ends is bent laterally with respect to the other, as shown more clearly in Fig. 4, so that the ends are offset, and when the nut is turned down, one end will engage the fish plate and the other the nut.

These ends are beveled, as shown, so that they will have a cutting edge. The washer is of resilient material, and it will be evident that the said washer forms a close grip throughout its extent between the nut and the fish plate and the bolt. The ends, as shown in Fig. 4, cut into the material of the fish plate and the nut, and the tendency of the compressed ends to separate, as well as the opposite sides of the split 7, causes a very firm and steady pressure between the nut and the fish plate.

I claim:

1. A nut lock comprising a split washer having threads or ribs extending spirally of the same, and having its ends offset laterally with respect to each other, said threads or ribs running in a reverse direction to the threads of the bolt upon which the nut is to be used, said washer having its ends split in the plane of the washer and the opposite sides of the split being separated, and the washer being split intermediate its ends in the plane of the washer, and the side walls of the split being separated.

2. A nut lock comprising a split washer having threads or ribs extending spirally of the same, and having its ends offset laterally with respect to each other, said threads or ribs running in a reverse direction to the threads of the bolt upon which the nut is to be used, said washer having its ends split in the plane of the washer and the opposite sides of the split being separated.

3. A nut lock comprising a split washer having its ends offset laterally with respect to each other, said washer having its ends split in the plane of the washer and the opposite sides of the split being separated.

4. A nut lock comprising a split washer having its ends offset laterally with respect to each other, said washer being split intermediate its ends in the plane of the washer, and the side walls of the split being separated.

5. A nut lock comprising a split washer having its ends offset laterally with respect to each other, said washer being split intermediate its ends in the plane of the washer, and the side walls of the split being separated, the threads or ribs running in a reverse direction to the threads of the bolt.

TOWNSON HAND.

Copies of this patent may be obtained for five cents each, by addressing the "Commissioner of Patents. Washington, D. C."